United States Patent Office 3,445,466
Patented May 20, 1969

3,445,466
PRODUCTION OF AROMATIC CARBOXYLIC ACIDS CONTAINING REACTIVE CHLORINE ATOMS
Erwin Hahn, Viernheim, Hesse, and Matthias Seefelder, Ludwigshafen (Rhine), Germany, assignors to Badische Anilin- & Soda-Fabrik Aktiengesellschaft, Ludwigshafen (Rhine), Germany
No Drawing. Filed Feb. 18, 1966, Ser. No. 528,378
Claims priority, application Germany, Feb. 24, 1965, B 80,671
Int. Cl. C07d *91/60, 51/36;* C09b *45/18*
U.S. Cl. 260—251        1 Claim

ABSTRACT OF THE DISCLOSURE

Production of carboxylic acids having the Formula I below by heating a benzene trichloromethyl compound of Formula II below with formic acid at 40–120° C. and synthesis of reactive dyes therewith.

---

This invention relates to a new method of producing carboxylic acids having the general formula:

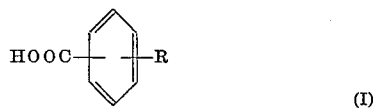

(I)

in which R denotes a 5-chlorothiadiazole, 2,6-dichloropyrimidine, 6-chloropyrimidine, or 4,6-dichloropyrimidine radical, or together with the benzene ring, denotes the 2-chlorobenzothiazole ring, and the carboxylic group is not vicinal to the radical R.

It is known that compounds containing trichloromethyl groups can be hydrolyzed to the corresponding carboxylic acids if they are heated with acetic acid, chloroacetic acid, maleic acid or toluenesulfonic acid. According to these prior art methods it is not possible however to convert trichloromethyl compounds which contain reactive chlorine atoms on a heterocyclic substituent selectively (i.e. without simultaneous loss of reactive chlorine atoms) into the corresponding carboxylic acids. If mild conditions are used by treating such compounds, for example 3-(p-trichloromethylphenyl-5-chlorothiadiazole-1,2,4, with boiling acetic acid, no reaction takes place at all. If the reaction is accelerated by adding e.g. zinc chloride or iron (III) chloride, however, carboxylic acids are obtained which do not contain any reactive chlorine. These reaction accelerators also have the disadvantage that they promote the formation of undesired byproducts. Moreover, since in most of such methods for the hydrolysis of trichloromethyl groups, it is necessary to remove the byproducts by distillation, these methods are not suitable for the treatment of heterocyclic compounds having reactive chlorine atoms owing to the thermal instability of these compounds.

We have now found that aromatic carboxylic acids containing reactive chlorine atoms and having the general Formula I may be prepared in a particularly advantageous manner by heating an aromatic trichloromethyl compound having the general formula:

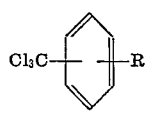

(II)

in which R has the above meaning, with formic acid at a temperature of from 40° to 120° C.

According to the new process the said aromatic trichloromethyl compounds are heated in concentrated formic acid, which is advantageously used in excess, at temperatures of from 40° to 120° C., preferably from 60° to 100° C. The excess of formic acid should be such that a mixture is formed which can be stirred well. Since only gaseous byproducts are formed by the reaction which, in the case of using 3-(p-trichloromethylphenyl)-5-chlorothiadiazole-1,2,4, proceeds according to the following equation:

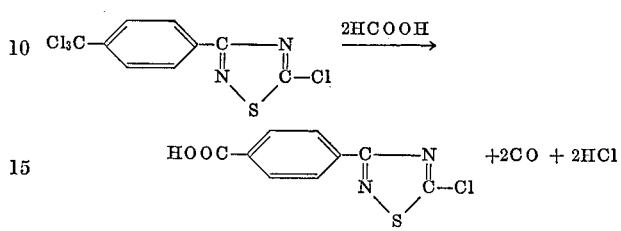

the course of the reaction may be followed by observing the disengagement of gas. The carboxylic acids are usually deposited in crystalline form while the reaction mixture is still hot. In some cases it may be advantageous to complete deposition of the carboxylic acids from the reaction mixture by adding water. The products of the process may be recrystallized, for example from alcohols.

This smooth course of the reaction, in which the hydrolysis proceeds with the desired high selectivity, is surprising because from Chem. Ber. 90, 182 (1957) it is known that the chlorine atom in 5-chlorothiadiazoles is attacked by concentrated sulfuric acid, disengagement of hydrogen chloride beginning at only 50° C.

For example the following carboxylic acids, some of which have not been previously described, may be obtained by the new process:

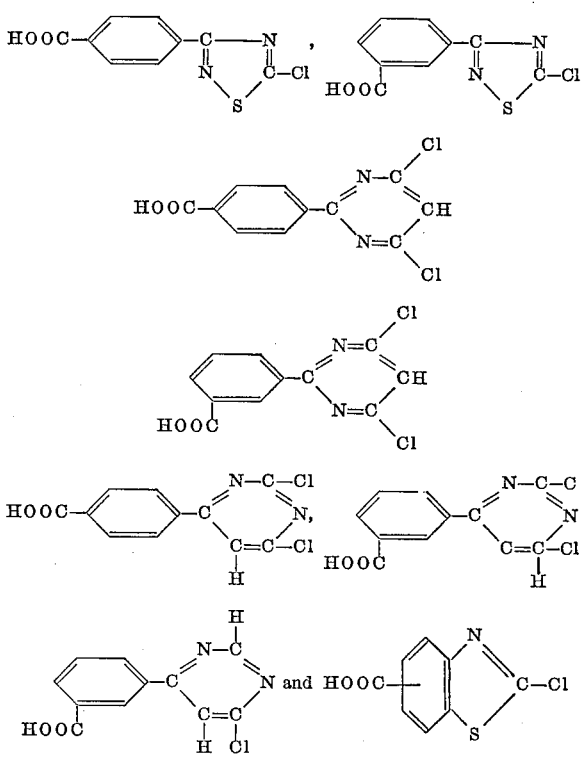

The carboxylic acids obtainable by the process according to this invention are important intermediates, for example for the production of dyes. They may be converted by conventional methods into the corresponding acid chlorides which may serve for the production of reactive dyes.

Reactive dyes whose production is possible in this way with the carboxylic acids obtainable by the process according to this invention, are for example the dyes having the following formulae, which give dyeings of the shades indicated:

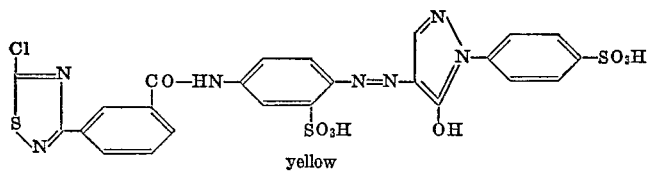
yellow

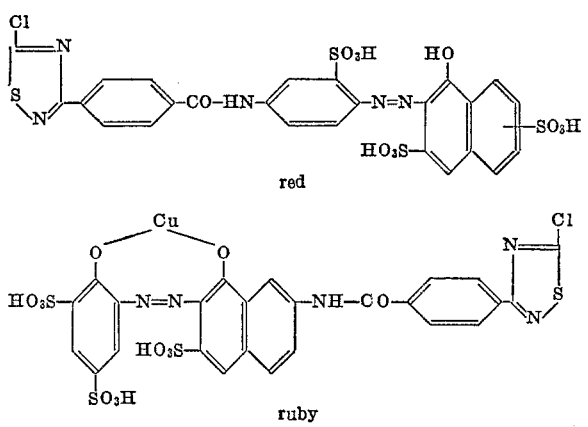
red ruby and

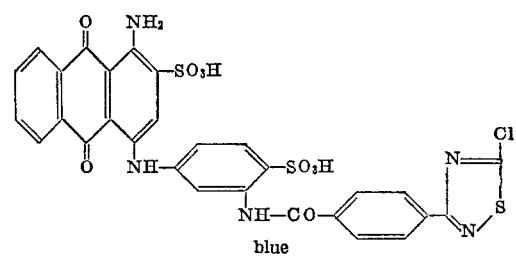
blue

The trichloromethyl compounds to be used as starting compounds for the new process may be prepared for example by chlorination of the corresponding methyl compounds.

The invention is illustrated by the following examples in which parts are by weight.

Example 1

60.5 parts of 3-(m-trichloromethylphenyl)-5-chlorothiadiaxole-1,2,4 is heated with 350 parts of concentrated formic acid at 60° C. until disengagement of gas subsides. The temperature is then raised slowly to 100° C. After the disengagement of gas has ceased, the mixture is allowed to cool. The residue is dried in vacuo. 46 parts (96% of the theory) of pure 3-(m-carboxyphenyl)-5-chlorothiadiazole 1,2,4 is obtained having a melting point of 203° to 204° C.

The starting compound may be obtained in the following way: chlorine is passed into a mixture of 148 parts of 3-(m-methylphenyl)-5-chlorothiadiazole-1,2,4 and 3 parts of benzamide while stirring and at the same time irradiating, first at 120° C. and later with a rise in temperature to 160° C. until the amount of chlorine has been absorbed which is necessary for conversion into the trichloro compound. The product is fractionally distilled in vacuo. 194 parts of 3-(m-trichloromethylphenyl)-5-chlorothiadiazole-1,2,4 (92% of the theory) is obtained as a distillate at 142° to 143° C. and a pressure of 0.1 mm. Hg. The compound, after solidification, melts aa 47° to 48° C.

The corresponding acid chloride may be obtained from the carboxylic acid obtainable according to this example by heating 46 parts of this acid with 143 parts of thionyl chloride under reflux until the reaction is complete, distilling off the excess of thionyl chloride and then recrystallizing the acid chloride from ethyl acetate. The yield is 40 parts and the melting point is 108° to 109° C.

Example 2

62 parts of 3-(p-trichloromethylphenyl)-5-chlorothiadiazole-1,2,4 is reacted with 450 parts of formic acid in the way described in Example 1. 46.5 parts of 3-(p-carboxyphenyl) - 5 - chlorothiadiazole-1,2,4 having a melting point of 268° to 270° C. (97% of the theory) is obtained.

The starting compound may be obtained as follows: 84 parts of 3-(p-methylphenyl)-5-chlorothiadiazole is reacted at 150° to 175° C. with 100 parts of chlorine in the presence of 2 parts of benzamide with exposure to light. The reaction product solidifies on cooling and has a melting point of 144° to 150° C. 101 parts of analytically pure 3-(p-trichloromethyphenyl)-5-chlorothiadiazole having a melting point of 151° to 152° C. is obtained by recrystallization from benzene.

41 parts of the corresponding acid chloride having a melting point of 114° to 115° C. is obtained from 40 parts of the carboxyic acid obtainable according to this example by the method described in the last paragraph of Example 1.

Example 3

739 parts of 2-(m-trichloromethylphenyl)-4,6-trichloropyrimidine is heated in 2000 parts of concentrated formic acid for two hours at refluxing temperature and the reaction is cooled. The reaction product is suction filtered, washed with a little water and dried in vacuo. 564 parts of 2-(m-carboxyphenyl-4,6-dichloropyrimidine is obtained in pure form. The substance melts at 249° to 251° C.

The starting compound may be obtained as follows: a melt of 945 parts of 2-(m-methylphenyl)-4,6-dichloropyrimidine is reacted with 3 equivalents of chlorine in the way described in Example 2. The viscous reaction product is distilled in vacuo and 1140 parts of analytically pure 2-(m-trichloromethylphenyl)-4,6-dichloropyrimidine is obtained between 193° and 195° C. at 1 mm. Hg. After the compound has solidified, it melts at 45° to 46° C.

596 parts of the corresponding acid chloride having a melting point of 117° to 118° C. is obtained from 562 parts of the acid obtainable according to this example, by the method described in the last paragraph of Example 1.

Example 4

347 parts of 2-(p-trichloromethylphenyl)-4,5-dichloropyrimidine is heated with 1000 parts of concentrated formic acid at refluxing temperature for two hours and then the mixture is cooled. The reaction product is suction filtered, washed with water and dried in vacuo. 265 parts of 2-(p-carboxyphenyl)-4.6-dichloropyrimidine having a melting point of 253° to 254° C. is obtained.

The starting compound may be obtained in the following way: 388 parts of 2-(p-methylphenyl)-4,6-dichloropyrimidine is chlorinated as described in Example 2. The crude product is distilled. 475 parts of pure 2 - (p - trichloromethylphenyl) - 4,6 - dichloropyrimidine passes over at from 192° to 194° C. at 0.3 mm. Hg and immediately crystallizes. The melting point of the substance is 133° to 135° C.

282 parts of the corresponding acid chloride having a melting point of 113° to 114° C. is obtained by the method described in the last paragraph of Example 1 from 265 parts of the acid obtainable according to the present example.

Example 5

68.5 parts of 4-(p-trichloromethylphenyl)-2,6-dichloropyrimidine is heated with 150 parts of formic acid at 65° to 70° C. until disengagement of gas can no longer be detected. The product is suction filtered, washed with a little water and dried in vacuo. 50 parts of 4-(p-carboxyphenyl)-2,6-dichloropyrimidine having a melting point of 205° to 207° C. is obtained.

The starting compound is obtained as follows: 217 parts of 4-(p-methylphenyl)-2,6-dichloropyrimidine is chlorinated at 150° to 170° C. in the presence of 4 parts of benzamide with irradiation until the amount of chlorine required theoretically has been absorbed. The crude product is fractionally distilled. 262 parts (85% of the theory) of pure 4-(p-trichloromethylphenyl)-2,6-dichloropyrimidine is obtained at from 194° to 196° C. at 0.1 mm. Hg. The product melts at 88° to 90° C.

42 parts of the corresponding acid chloride having a melting point of 190° to 192° C. is obtained by the method described in the last paragraph of Example 1 from 48 parts of the acid obtainable according to the present example.

Example 6

224 parts of 4-(m-trichloromethylphenyl)-2,6-dichloropyrimidine is stirred at 65° to 70° C. with 300 parts of formic acid until disengagement of gas has ceased. The crystalline product is suction filtered after cooling and recrystallized from isobutanol. 167 parts of 4-(m-carboxyphenyl)-2,6-dichloropyrimidine having a melting point of 215° to 216° C. is obtained.

The starting compound may be obtained as follows: 180 parts of 4-(m-methylphenyl)-2,6-dichloropyrimidine is chlorinated in the presence of 4 parts of benzamide by the method described in the second paragraph of Example 5. The product is distilled. 230 parts of 4-(m-trichloromethylphenyl)-2,6-dichloropyrimidine having a melting point of 74° to 75° C. is obtained at from 186° to 189° C. and at 0.1 mm. Hg.

382 parts of the corresponding acid chloride which melts at 148° to 149° C. is obtained by the method described in the last paragraph of Example 1 from 434 parts of the acid obtainable according to the present example.

We claim:
1. A process for the production of carboxylic acids having the general formula:

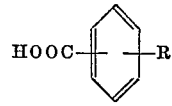

in which R denotes a radical selected from the group consisting of 5-chlorothiadiazole-1,2,4, 2,6-dichloropyrimidine, 6-chloropyrimidine, 4,6-dichloropyrimidine and (together with the benzene ring) 2-chlorobenzothiazole, and the carboxyl group is not vicinal to the radical R, which comprises heating a trichloromethyl compound having the general formula:

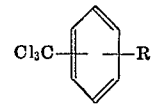

in which R has the above meaning with formic acid to a temperature of from 40° to 120° C.

References Cited

FOREIGN PATENTS 977,697   12/1964   England.

ALEX MAZEL, *Primary Examiner.*

R. V. RUSH, *Assistant Examiner.*

U.S. Cl. X.R.

260—146, 158, 302, 304

UNITED STATES PATENT OFFICE
CERTIFICATE OF CORRECTION

Patent No. 3,445,466                      May 20, 1969

Erwin Hahn et al.

It is certified that error appears in the above identified patent and that said Letters Patent are hereby corrected as shown below:

Column 1, line 45, "chloromethylphenyl" should read -- chloromethylphenyl) --. Column 2, lines 54 to 58, the right-hand formula should appear as shown below:

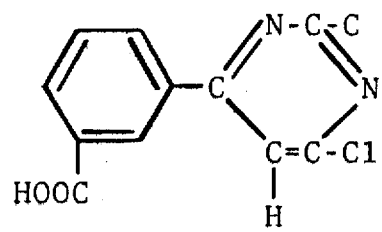

same column 2, lines 59 to 64, the left-hand formula should appear as shown below:

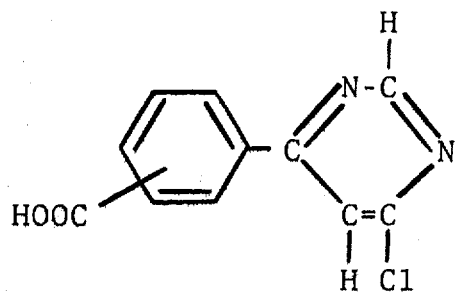

Column 3, lines 10 to 16, the formula should appear as shown below:

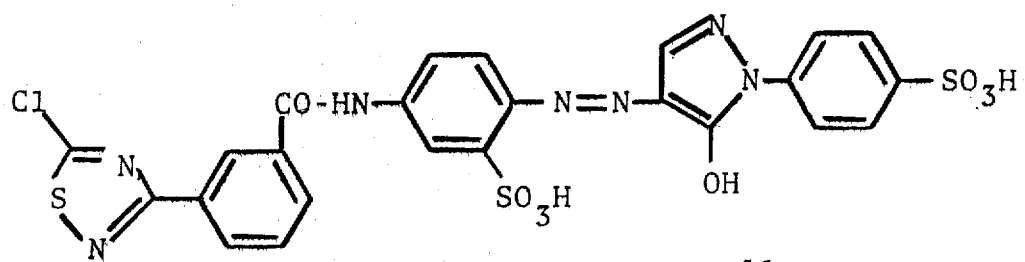

yellow same column 3, lines 17 to 23, the formula should appear as shown below:

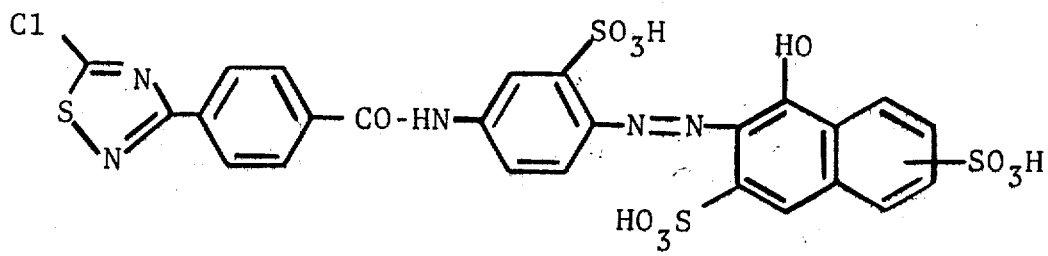

red

Signed and sealed this 28th day of April 1970.

(SEAL)
Attest:

EDWARD M. FLETCHER, JR.
Attesting Officer

WILLIAM E. SCHUYLER, JR.
Commissioner of Patents